United States Patent [19]
van Basshuysen et al.

[11] Patent Number: 5,033,417
[45] Date of Patent: Jul. 23, 1991

[54] METHOD FOR OPERATING A SPARK-IGNITION INTERNAL COMBUSTION ENGINE OF A VEHICLE AND A SPARK-IGNITION INTERNAL COMBUSTION ENGINE OF A VEHICLE OPERATING ACCORDING TO THIS METHOD

[75] Inventors: Richard van Basshuysen, Bad Wimpfen; Günter Krömer, Heilbronn, both of Fed. Rep. of Germany

[73] Assignee: Audi AG, Ingolstadt, Fed. Rep. of Germany

[21] Appl. No.: 537,029

[22] Filed: Jun. 12, 1990

[30] Foreign Application Priority Data

Jun. 27, 1989 [DE] Fed. Rep. of Germany ....... 3920966

[51] Int. Cl.$^5$ .............................................. F02M 35/10
[52] U.S. Cl. ................................................ 123/52 MB
[58] Field of Search ......... 123/52 M, 52 MB, 52 MC, 123/52 MV, 52 MF, 52 ML

[56] References Cited

U.S. PATENT DOCUMENTS

| 4,619,226 | 10/1986 | Ueda et al. | 123/52 MB |
| 4,726,329 | 2/1988 | Atkin | 123/52 MV |
| 4,790,281 | 12/1988 | Mieno et al. | 123/425 |
| 4,858,568 | 8/1989 | Obayashi et al. | 123/52 MC |
| 4,932,369 | 6/1990 | Parr | 123/52 MB |

FOREIGN PATENT DOCUMENTS 60-147531 8/1985 Japan ............................ 123/52 MB Primary Examiner—David A. Okonsky
Attorney, Agent, or Firm—Kane, Dalsimer, Sullivan, Kurucz, Levy, Eisele and Richard

[57] ABSTRACT

The operation of a spark-ignition internal combustion engine of a vehicle, which is provided with an exhaust gas catalyst, with fuels of very different octane numbers is made possible without endangering the internal combustion engine and the exhaust gas catalyst owing to the fact that, when combustion with knocking occurs, at first the ignition angle is withdrawn up to a particular value, that is, the ignition timing is adjusted in the direction or retarded ignition, and then, in the event of further knocking, the suction pipe length is changed for the purpose of reducing the amount of fuel charged to the cylinder.

3 Claims, 1 Drawing Sheet

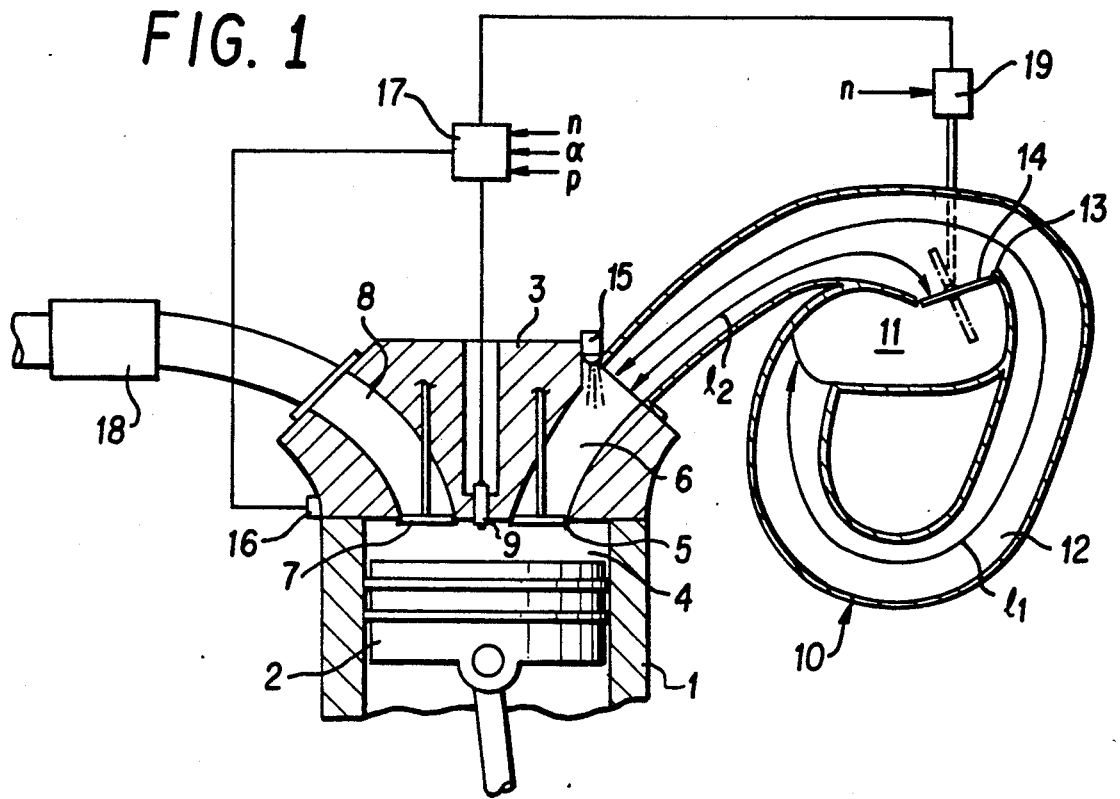
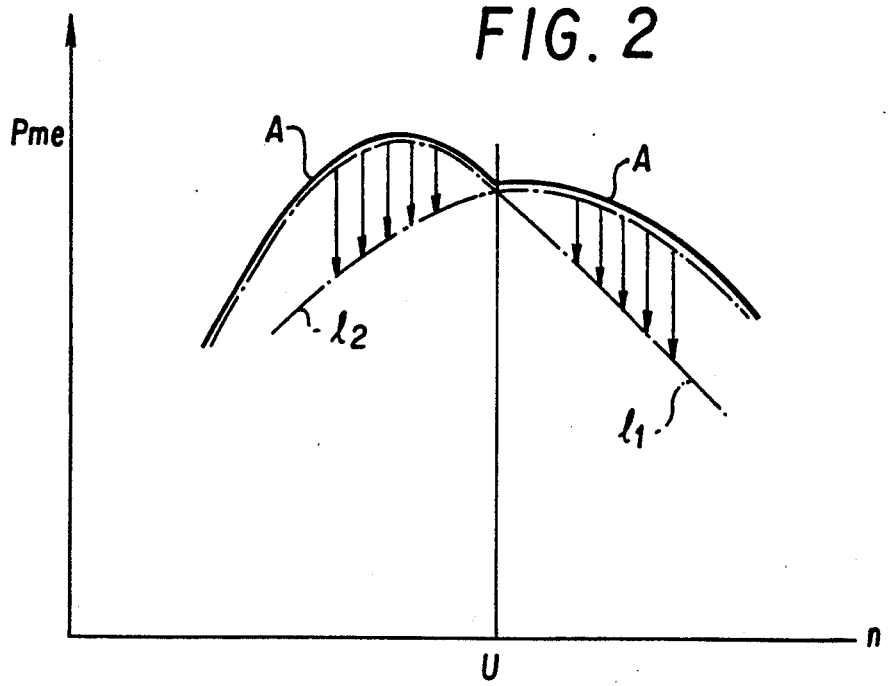

METHOD FOR OPERATING A SPARK-IGNITION INTERNAL COMBUSTION ENGINE OF A VEHICLE AND A SPARK-IGNITION INTERNAL COMBUSTION ENGINE OF A VEHICLE OPERATING ACCORDING TO THIS METHOD

The invention relates to a method for operating a spark-ignition internal combustion engine of a vehicle that is provided with an exhaust gas catalyst and a spark-ignition internal combustion engine of a vehicle operating according to this method.

In spark-ignition internal combustion engines, particularly those used to drive a motor vehicle, knocking may occur during the combustion, particularly when a fuel with too low an octane number is used. This knocking can seriously endanger the internal combustion engine. To avoid such a hazard, so-called knocking-control systems have become known, in which a sensor detects combustion with knocking. If the incidence of knocking during combustion exceeds a certain number, the firing angle is withdrawn, that is, the ignition timing is adjusted in the direction of retarded ignition. By these means, the tendency to knock is decreased. If combustion with knocking occurs again, the firing angle is adjusted once more. If the adjustment exceeds a certain measure, then not only the firing angle, but also the map containing the basic setting of the firing angle is adjusted (map adaptation). By these means, a high compression can be realized, which results, particularly under conditions of a partial load, in an advantageous fuel consumption and good exhaust gas values, since the tendency to knock, which occurs under a full load and at a high rpm, is decreased by adjusting the ignition timing in the direction of retarded ignition. However, problems arise, if the possibility must be taken into consideration that an internal combustion engine, which is designed, for example, for a fuel with an octane number of 98, is operated either inadvertently or in the absence of a high octane fuel, with a fuel with a significantly lower octane number, such as an octane number of 91. This large span can no longer be bridged satisfactorily by adjusting the spark timing to retarded ignition, since an adjustment in the spark timing in the direction of retarded ignition, which exceeds a particular value, results in a large increase in the temperature of the exhaust gas, which endangers the catalyst.

It is an object of the invention to provide a method, with which an internal combustion engine can be operated with fuels of widely different octane ratings without the danger of knocking and without endangering the exhaust system.

The inventive method is characterized by to the fact that, if there is further knocking when a specified maximum value of the retarded ignition adjustment has been reached, the suction pipe length is shortened in the low rpm range and extended in the high rpm range.

The inventive proposal accomplishes that combustion with knocking is also avoided when the ignition timing can no longer be adjusted in the direction of retarded ignition, without thermally endangering the exhaust gas system and, in particular, the exhaust gas catalyst, because the amount of fuel charged to the cylinder and, with that, the compression pressure are reduced by changing the length of the suction pipe (shortening it in the low rpm range and lengthening it in the high rpm range). Admittedly, it is known that, by decreasing the amount of fuel charged to the cylinder, the tendency to knock can be reduced. However, due to the inventive proposal, this change in the amount of fuel charged to the cylinder becomes possible in a very simple manner and with little additional expense in an internal combustion engine, which has a suction pipe system with a variable suction pipe length.

Because of the relationship between the spark timing and the temperature of the exhaust gas, it is possible to define the permissible exhaust gas temperature, at which the suction pipe length is to be changed, by a given maximum value of the retarded ignition adjustment.

Further advantageous developments of the invention are given in the dependent claims.

An example of the operation of the invention is described in the following with reference to the drawings.

FIG. 1 shows a diagrammatic representation of a mixture-compressing, spark-ignition internal combustion engine with suction pipe system with a variable swing pipe length.

FIG. 2 shows a diagram, in which the average pressure is presented as a function of the rpm for two different swing pipe lengths.

Reference is made first of all to FIG. 1, in which a spark-ignition, mixture-compressing internal combustion engine is represented, of which only a cylinder 1 is shown, in which a piston 2, which with a cylinder head 3 limits a working space 4 of variable volume, is movable. Disposed in the cylinder head 3 for each cylinder there are an intake port 6 controlled by an inlet valve 5, an exhaust port 8 controlled by an exhaust valve 7, a spark plug 9 and a fuel injection valve 15. A suction pipe system 10 is connected to the intake port 6. This suction pipe system 10 contains an intake manifold 11, from which a long suction pipe 12, which discharges into the intake port 6, goes out to each cylinder 1. The intake manifold 11 is connected to an intake line with air filter and butterfly valve, which are not shown.

The ram pipe length $l_1$ of the long suction pipe 12 is designed so that a high torque is attained in the low to medium rpm range of the internal combustion engine. A shorter swing pipe length is required to attain a high mean pressure at a high rpm. In order to attain such a high mean pressure, the intake manifold 11 is connected with the long suction pipe 12 at a site closer to the cylinder 1 by means of a by-pass opening 13, which is controlled by a changeover valve 14. The changeover valve 14 is closed in the low to medium rpm range, so that the long ram pipe length $l_1$ becomes effective. When a certain rpm is reached, the changeover valve 14 is opened by a control mechanism 19, so that the short ram pipe length $l_2$ now is effective. This position of the changeover valve is shown by a broken line.

At a suitable site on the internal combustion engine, a knocking sensor 16 is mounted, which, when combustion with knocking occurs in the working chamber 4, passes on signals to a control device 17 for adjusting the ignition timing of the spark plug 9. Stored in the control device 17 in the usual manner is a map with the firing angle characteristics. As a function of the rpm n, the suction pipe pressure p, the setting angle alpha of the butterfly valve and/or other parameters, the map adjusts an optimum firing angle, which is as close as possible to the knocking boundary. If the knocking sensor 16 detects combustion with knocking of a particular intensity, the firing angle is adjusted stepwise by the control device 17 in the direction of retarded ignition, until combustion with knocking ceases. If a certain degree of adjustment is exceeded, then not only the firing angle, but also the map for the basic setting of the firing angle is adjusted (so-called map adaptation). Since the exhaust gas temperature increases due to the adjustment of the firing angle in the direction of retarded ignition, the firing angle can be withdrawn only up to a certain value, without thermally endangering the exhaust system and, in particular, the exhaust-gas catalyst 18 disposed therein. If now the internal combustion engine is operated with a fuel, the octane number of which is considerably below the values, for which the internal combustion engine is designed, it may happen that combustion with knocking will not cease when this limiting value of the retarded ignition setting is reached. If this should happen in the upper range of the rpm, in which the changeover valve 14 is opened by the switching device 19, then the switching device 19 receives a signal from the control device 17 to close the changeover valve 14. The ram pipe length $l_1$ is then effective, as a result of which the mean pressure and correspondingly the amount of fuel charged to the cylinder and the compression pressure are reduced in this rpm range and the combustion with knocking is eliminated. The control device 17 can now adjust the ignition timing stepwise in the direction of advanced ignition and hold the timing near the knocking limit. By these means, the internal combustion engine is operated optimally with the long ram pipe length $l_1$; however, a certain loss of performance has to be accepted. If in the low rpm range combustion with knocking cannot be prevented even by the adaptation of the map described above, then the changeover valve 14, which is normally closed in this rpm range, is opened so that ram pipe length $l_2$ becomes effective. By these means, the mean pressure and, with that, the amount of fuel charged to the cylinder and the compression pressure are reduced once again, as is evident from the diagram of FIG. 2.

Since the tendency of the internal combustion engine to knock is reduced only when the tank is filled with a higher octane fuel, the changeover valve 14 remains closed or open up to this time. Since the internal combustion engine necessarily is switched off whenever the tank is filled, the arrangement is designed so that, when restarting, the mechanism of the switching device 19, which responds to the signal of the control device 17, is deactivated, so that the changeover valve 14, corresponding to normal operations, is opened when a particular engine rpm is reached. If combustion with knocking occurs despite the fact that the limiting value of the retarded ignition setting has been reached, then this indicates that the vehicle is still being driven, as before, with a low-octane fuel and the changeover valve 14 is activated in the previously described manner.

The diagram of FIG. 2 should now be referred to. In this diagram, the means pressure is shown as a function of the rpm for the switchable intake pipe system 10. The broken line shows the variation in the mean pressure with the long ram pipe length $l_1$ and the line of dots and dashes shows the variation in the mean pressure when the changeover valve 14 is open, that is, with the short ram pipe length $l_2$. For a changeover rpm of, for example, 3,500, the mean pressure varies as shown by the solid line A. If combustion with knocking occurs in the low rpm range when operating with a low-octane fuel in spite of having retarded the ignition timing as much as possible, the changeover valve 14, which normally is closed in this rpm range, is opened and the mean pressure drops to the value of the line $l_2$ of dots and dashes. If the knocking occurs in the upper rpm range, the mean pressure is lowered to the value of the broken line $l_1$ by closing the changeover valve 14, which is normally open in this rpm range. In both cases, the amount of fuel charged to the cylinder and, with that, the tendency to knock are reduced.

We claim:

1. A method for operating a spark-ignition internal combustion engine of a vehicle with fuels from throughout a wide range of octane numbers, including the steps of:

determining if the engine is knocking;

retarding an ignition setting in response to knocking detected by said determining step;

adjusting a suction pipe length in response to said determining step after a specified maximum value of the retarded ignition setting is reached so that said suction pipe is shortened in the low rpm range and lengthened in the high rpm range.

2. A spark-ignition internal combustion engine of a vehicle comprising:

an exhaust gas system including a catalyst;

means for determining if the engine is knocking;

means for retarding an ignition setting in response to knocking detected by said means for determining;

and further comprising a suction pipe system with a variable ram pipe length and a control mechanism which, when a maximum value of retarded ignition setting is reached and knocking is determined by said means for determining, shortens said variable ram pipe length in the low rpm range and lengthens said ram pipe in the high rpm range.

3. The spark-ignition internal combustion engine of claim 2 wherein the suction pipe system includes a first suction pipe section which is longer than a second suction pipe section; and a changeover valve, wherein said second suction pipe section can be selected by opening said changeover valve; and wherein said control mechanism is responsive to said means for retarding an ignition setting so that after said maximum value of retarded ignition setting is reached, said changeover valve is opened in the low rpm range and closed in the high rpm range in response to said means for determining if the engine is knocking.

* * * * *